US010914973B2

(12) United States Patent
Zhou

(10) Patent No.: US 10,914,973 B2
(45) Date of Patent: Feb. 9, 2021

(54) LIQUID CRYSTAL DISPLAY DEVICE

(71) Applicant: WUHAN CHINA STAR OPTOELECTRONICS TECHNOLOGY CO., LTD, Hubei (CN)

(72) Inventor: Zheng Zhou, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/613,429

(22) PCT Filed: Oct. 21, 2019

(86) PCT No.: PCT/CN2019/112220
§ 371 (c)(1),
(2) Date: Nov. 14, 2019

(87) PCT Pub. No.: WO2020/253005
PCT Pub. Date: Dec. 24, 2020

(65) Prior Publication Data

US 2020/0400995 A1 Dec. 24, 2020

(30) Foreign Application Priority Data

Jun. 19, 2019 (CN) .......................... 2019 1 0533631

(51) Int. Cl.

*G02F 1/1333* (2006.01)
*G02F 1/13357* (2006.01)
*F21V 8/00* (2006.01)

(52) U.S. Cl.
CPC ....... *G02F 1/133308* (2013.01); *G02B 6/009* (2013.01); *G02F 1/133608* (2013.01); *G02F 2001/133314* (2013.01); *G02F 2001/133317* (2013.01); *G02F 2202/28* (2013.01)

(58) Field of Classification Search
CPC .... G06F 1/1656; G06F 3/0412; G06F 1/1643; G02F 1/133308; G02F 1/133608; G02F 2202/28; G02F 2001/133314; G02F 2001/133317; G02B 6/009
USPC ..................................................... 349/58–60
See application file for complete search history.

(56) References Cited

U.S. PATENT DOCUMENTS

2013/0293804 A1* 11/2013 Kim ...................... B29C 65/542 349/58
2015/0234434 A1* 8/2015 Lin ....................... G06F 1/1601 345/173
2015/0253612 A1* 9/2015 Hasegawa ......... G02F 1/133308 349/58
2017/0038515 A1* 2/2017 Yuki .................... G02B 6/0061

* cited by examiner

*Primary Examiner* — Charles S Chang
(74) *Attorney, Agent, or Firm* — Mark M. Friedman

(57) ABSTRACT

A liquid crystal display device includes a display panel, a backlight module, and a connecting portion. The backlight module includes a back frame having a backplate and a bent portion connected to the backplate. The connecting portion includes a first fixing portion disposed on an end surface of the bent portion and fixedly connected to the end surface of the bent portion and the display panel. An orthographic projection of the end surface of the bent portion on the display panel covers an orthographic projection of an outer side of the first fixing portion on the display panel.

10 Claims, 6 Drawing Sheets

11 13 12 41 312 31 313 311 32 322 321 50 40 22 20 24 23 25 42 211 212 21

LIQUID CRYSTAL DISPLAY DEVICE

BACKGROUND OF INVENTION

1. Field of Invention

The present invention relates to a technical field of displays, and particularly to, a liquid crystal display device.

2. Related Art

With development of in-vehicle display technology, standards of in-vehicle display panels have also been raised. Optical films of in-vehicle display panels are expanding under a high temperature condition, and bezels of in-vehicle display panels are required to be more and more narrow in industries. If there is no sufficient space reserved in a direction where the optical films expand, the optical films may become wrinkled due to obstruction of expansion of the optical films, resulting in optical defects.

Since requirements for firmness of in-vehicle displays are strict, gaps between optical films and back frames are to be sufficiently reserved to ensure that expansion of the optical films is not to be obstructed under a high temperature condition. For medium and large-sized in-vehicle display panels, considering a problem about strength, thick aluminum sheet metal, or cast aluminum parts are generally used to form frame-shaped back frames. Furthermore, considering adding touch functions, middle plastic frame structures are often used on outer sides of back frames to fix back frames to touch screens, giving rise to failure of fulfilling requirements of narrow frames.

In conventional liquid crystal display devices, back frames are fixed to touch screens by middle plastic frame structures configured on sides of back frames, thereby causing a technical problem that narrow frame requirements cannot be satisfied.

SUMMARY OF INVENTION

A liquid crystal display device comprises a display panel, a backlight module, and a connecting portion connecting the backlight module and the display panel; wherein the backlight module comprises a back frame, and the back frame comprises a backplate and a bent portion connected to the backplate; wherein the connecting portion comprises a first fixing portion disposed on an end surface of the bent portion and fixedly connected to the end surface of the bent portion and the display panel, wherein an orthographic projection of the end surface of the bent portion on the display panel covers an orthographic projection of an outer side of the first fixing portion on the display panel, wherein the fixing portion comprises a first adhesive layer, a sealing layer, and a second adhesive layer laminated to each other, the sealing layer is connected to the end surface of the bent portion through the first adhesive layer, and the sealing layer is connected to the display panel through the second adhesive layer, and wherein the connecting portion further comprises a second fixing portion fixedly connected to the first connecting portion, and the second fixing portion is disposed on an inner wall of the bent portion and is attached to the inner wall of the bent portion.

Further, the bent portion is disposed on peripheries of the backplate, and an accommodation chamber is formed between the bent portion and the backplate, wherein the backlight module further comprises an optical film disposed in the accommodation chamber, and a gap is formed between the optical film and the inner wall of the bent portion.

Further, a buffer layer is disposed between the optical film and the display panel.

Further, the buffer layer comprises an elastic element and a spacer laminated to each other, wherein the elastic element is fixedly connected to one of the display panel and the optical film, and the spacer is disposed between the other one of the display panel and the optical film and the elastic element.

Further, the connecting portion further comprises a second fixing portion fixedly connected to the first connecting portion, and the second fixing portion comprises an adhesive fixing layer and a connection layer, wherein the connection layer is connected to the inner wall of the bent portion through the adhesive fixing layer, and the connection layer is connected to the sealing layer.

Further, the bent portion is disposed on peripheries of the backplate, and an accommodation chamber is formed between the bent portion and the backplate, wherein the backlight module further comprises an optical film disposed in the accommodation chamber, a gap is formed between the optical film and the inner wall of the bent portion, and a buffer layer is disposed between the optical film and the display panel, and wherein the buffer layer comprises a elastic element and a spacer laminated to each other, the elastic element is fixedly connected to one of the display panel and the optical film, and the spacer is disposed between the other one of the display panel and the optical film and the elastic element, wherein the spacer, the connection layer, and the sealing layer are integrally formed with each other, and the first adhesive layer and the adhesive fixing layer are integrally formed with each other.

Further, the first adhesive layer, the second adhesive layer, and the adhesive fixing layer are all made of a viscous material, and the spacer, the connection layer, and the sealing layer are all made of an insulating sealing material.

A liquid crystal display device comprises a display panel, a backlight module, and a connecting portion connecting the backlight module and the display panel; wherein the backlight module comprises a back frame, and the back frame comprises a backplate and a bent portion connected to the backplate; wherein the connecting portion comprises a first fixing portion disposed on an end surface of the bent portion and fixedly connected to the end surface of the bent portion and the display panel, wherein an orthographic projection of the end surface of the bent portion on the display panel covers an orthographic projection of an outer side of the first fixing portion on the display panel.

Further, the fixing portion comprises a first adhesive layer, a sealing layer, and a second adhesive layer laminated to each other, wherein the sealing layer is connected to the end surface of the bent portion through the first adhesive layer, and the sealing layer is connected to the display panel through the second adhesive layer.

Further, the connecting portion further comprises a second fixing portion fixedly connected to the first connecting portion, and the second fixing portion is disposed on an inner wall of the bent portion and is attached to the inner wall of the bent portion.

Further, the bent portion is disposed on peripheries of the backplate, and an accommodation chamber is formed between the bent portion and the backplate, wherein the backlight module further comprises an optical film disposed in the accommodation chamber, and a gap is formed between the optical film and an inner wall of the bent portion.

Further, a buffer layer is disposed between the optical film and the display panel.

Further, the buffer layer comprises an elastic element and a spacer laminated to each other, wherein the elastic element is fixedly connected to one of the display panel and the optical film, and the spacer is disposed between the other one of the display panel and the optical film and the elastic element.

Further, the connecting portion further comprises a second fixing portion fixedly connected to the first connecting portion, and the second fixing portion comprises an adhesive fixing layer and a connection layer, wherein the connection layer is connected to an inner wall of the bent portion through the adhesive fixing layer, and the connection layer is connected to the sealing layer.

Further, the bent portion is disposed on peripheries of the backplate, and an accommodation chamber is formed between the bent portion and the backplate, wherein the backlight module further comprises an optical film disposed in the accommodation chamber, a gap is formed between the optical film and the inner wall of the bent portion, and a buffer layer is disposed between the optical film and the display panel, and wherein the buffer layer comprises a elastic element and an spacer laminated to each other, the elastic element is fixedly connected to one of the display panel and the optical film, and the spacer is disposed between the other one of the display panel and the optical film and the elastic element, wherein the spacer, the connection layer, and the sealing layer are integrally formed with each other, and the first adhesive layer and the adhesive fixing layer are integrally formed with each other.

Further, the first adhesive layer, the second adhesive layer, and the adhesive fixing layer are all made of a viscous material, and the spacer, the connection layer, and the sealing layer are all made of an insulating sealing material.

Further, the display panel comprises a touch screen body and a liquid crystal panel body disposed on a back of the touch screen body, wherein the liquid crystal display body is located in the accommodation chamber and is connected to the touch screen body, and the first fixing portion is connected to the back of the touch screen body.

Further, the backlight module further comprises a light source located in the accommodation chamber, a reflective plate, and a light guide plate, wherein the light source is fixedly disposed on an inner wall of the bent portion, the reflective plate and the light guide plate are both parallel with the backplate, the reflective plate is fixedly disposed on the backplate, and the light guide plate is disposed between the reflective plate and the optical film.

Further, the light source is disposed between the light guide plate and the bent portion.

Further, the backlight module further comprises a light source and a diffuser plate both disposed in the accommodation chamber, wherein the light source is fixedly disposed on the backplate, the diffuser plate is disposed between the optical film and the light source, and the diffuser plate is parallel with the backplate.

The present invention has advantageous effects as follows: the present invention utilizes the first fixing portion to replace a conventional middle plastic frame structure, ensuring connecting strength and in-vehicle firmness of the back frame with the display panel, so that thickness of a structure in a direction where the optical film expands is reduced, thereby to meet a requirement of a narrow frame design of the liquid crystal display device. Furthermore, a sufficient space can be reserved between the optical film and the inner wall of the bend portion to avoid optical defects resulting from wrinkles formed on the optical film due to obstruction of the expansion of the optical film.

BRIEF DESCRIPTION OF DRAWINGS

To describe the technical solutions in the embodiments of the present invention, the following briefly introduces the accompanying drawings for describing the embodiments. Apparently, the accompanying drawings in the following description show merely some embodiments of the present invention, and a person skilled in the art may still derive other drawings from these accompanying drawings without creative efforts.

DESCRIPTION OF PREFERRED EMBODIMENTS

Figure 1:
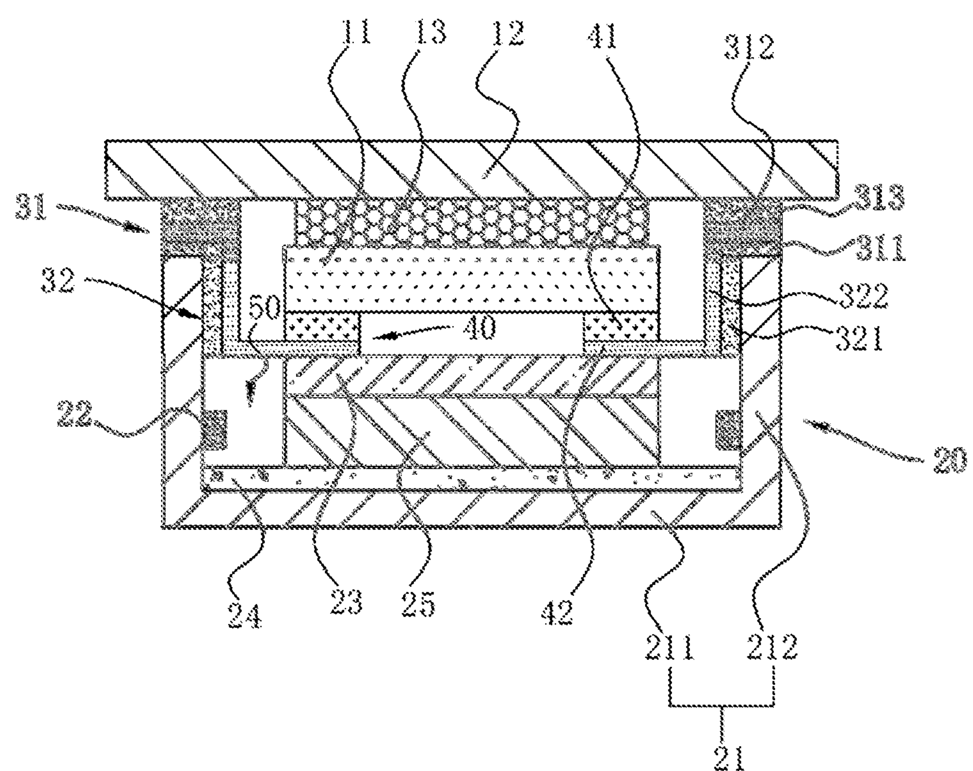
FIG. 1 is a schematic structural view of a liquid crystal display device of an embodiment of the present invention.

The following embodiments are referring to the accompanying drawings for exemplifying specific implementable embodiments of the present invention. Directional terms described by the present invention, such as upper, lower, front, back, left, right, inner, outer, side and etc., are only directions by referring to the accompanying drawings, and thus the used directional terms are used to describe and understand the present invention, but the present invention is not limited thereto. The same reference numerals in the drawings denote the same elements.

The present invention is provided to overcome a problem that conventional back frames are fixed to touch screens by middle plastic frame structures configured on sides of back frames, thereby giving rise to fail to fulfill requirements of narrow frames.

As shown in FIG. 1, a liquid crystal display device includes a display panel, a backlight module 20, and a connecting portion connecting the backlight module 20 and the display panel.

The display panel includes a touch screen body 12 and a liquid crystal panel body 11 disposed on a back of the touch screen body 12. The liquid crystal panel body 11 is fixedly connected to the touch screen body 12 through an optical adhesive layer 13.

The backlight module 20 includes a back frame 21. The back frame 21 includes a backplate 211 and a bent portion 212 connected to the backplate 211. The backplate 211 is disposed on a back side of the display panel, and the bent portion 212 is disposed on peripheries of the backplate 211 facing the display panel. An accommodation chamber 50 is formed between the bent portion 212 and the backplate 211.

The connecting portion includes a first fixing portion 31 disposed on an end surface of the bent portion 212. The first fixing portion 31 is disposed surrounding peripheries of the bent portion 212, and the first fixing portion 31 is fixedly connected to the end surface of the bent portion 212 and the display panel. An orthographic projection of the end surface of the bent portion 212 on the display panel covers an orthographic projection of an outer side of the first fixing portion 31 on the display panel.

It should be noted that the outer side of the first fixing portion 31 is defined as a side of the first fixing portion 31 far away from an inner wall of the bent portion 212.

The present invention utilizes the first fixing portion 31 to replace a conventional middle plastic frame structure, ensuring connecting strength and in-vehicle firmness of the back frame 21 with the display panel, so that thickness of a structure in a direction where the optical film 23 expands is reduced, thereby to meet a requirement of a narrow frame design of the liquid crystal display device.

In one embodiment, the bent portion 212 and the backplate 211 are integrally formed with each other. The bent portion 212 and the back plate 211 are made of materials including, but not limited to, sheet metal or aluminum alloy.

It should be noted that, in practice, the backplate 211 and the bent portion 212 may be separately formed and then connected by welding or movable connection assembly to form the back frame 21.

Further, the fixing portion 31 includes a first adhesive layer 311, a sealing layer 312, and a second adhesive layer 313 laminated to each other. The sealing layer 312 is connected to the end surface of the bent portion 212 through the first adhesive layer 311, and the sealing layer 312 is connected to the display panel through the second adhesive layer 313.

In one embodiment, the first adhesive layer 311 is adhesively attached to the end surface of the bent portion 212, the second adhesive layer 313 is adhesively attached the display panel, and the sealing layer 312 is bonded to the end surface of the bent portion 212 and the display panel by adhesiveness of the first adhesive layer 311 and the second adhesive layer 313.

In one embodiment, the first adhesive layer 311 and the second adhesive layer 313 are both made of a viscous material, such as double-sided tape or foam rubber. The sealing layer 312 is made of an insulating sealing material, such as Mylar tape, polyphthalic acid plastic, or polymethyl methacrylate, and is not enumerated herein.

Specifically, the connecting portion further includes a second fixing portion 32 fixedly connected to the first connecting portion 31. The second fixing portion 32 is disposed on an inner wall of the bent portion 212 and is attached to the inner wall of the bent portion 212.

The second fixing portion 32 is fixedly connected to both the inner wall of the bent portion 212 and the first fixing portion 31, thereby enhancing connecting strength between the display panel and the bent portion 212, and preventing the display panel from being separated from the back frame 21.

In one embodiment, the second fixing portion 32 includes an adhesive fixing layer 321 and a connection layer 322 fixedly connected to the adhesive fixing layer 31. The adhesive fixing layer 321 and the connection layer 322 are parallel with the bent portion 212. The adhesive fixing layer 321 is adhesively attached to the inner wall of the bent portion 212, and the connection layer 322 is fixedly connected to the sealing layer 312.

The backlight module 20 further includes an optical film 23 disposed in the accommodation chamber 50. The optical film 23 is parallel with the backplate 211 and is assembled on the back frame 21. A gap is formed between the optical film 23 and the inner wall of the bent portion 212.

In one embodiment, the second fixing portion 32 does not extend into a gap between the optical film 23 and the inner wall of the bent portion 212.

It should be noted that the gap reserved between the optical film 23 and the inner wall of the bent portion 212 is to provide a sufficient space for expansion of the optical film 23 under a high temperature condition, thereby to avoid optical defects resulting from wrinkles formed on the optical film 232 because the expansion of the optical film 232 is obstructed by an insufficient space. The expansion space is determined by a material, size, and external temperature conditions of the optical film 23. In practice, a distance between a sidewall of the optical film 23 and the inner wall of the bent portion 212 may also be determined according to actual conditions.

In one embodiment, a distance between the sidewall of the optical film 23 and the inner wall of the bent portion 212 is 0.2-1.4 millimeters.

Specifically, the liquid crystal panel body 11 is located in the accommodation chamber 50. The first fixing portion 21 is connected to the back of the touch screen body 12.

Specifically, a buffer layer 40 is disposed between the optical film 23 and the liquid crystal panel body 11. The buffer layer 40 is in contact with the optical film 23 and the liquid crystal panel body 11, so that buffering properties of the buffer layer 40 are utilized to mitigate effects on the liquid crystal panel body 11 when the optical film 23 is deformed.

Further, one of the liquid crystal panel body 11 and the optical film 23 is fixedly connected to the buffer layer 40, while the other one is unlimitedly connected to the buffer layer 40, thereby to prevent the optical film 23 from being completely fixed to the liquid crystal panel body 11, resulting in a situation that the optical film 23 is not extendable at high temperatures.

Further, the buffer layer 40 includes an elastic element 41 and a spacer 42 laminated to each other. The elastic element 41 is fixedly connected to one of the liquid crystal panel body 11 and the optical film 23. The spacer 42 is disposed between the other one of the liquid crystal panel body 11 and the optical film 23 and the elastic element 41.

It should be noted that FIG. 1 schematically shows the elastic element 41 and the liquid crystal panel body 11 are fixedly connected, wherein the spacer 42 is located between the elastic element 41 and the optical film 23. In practice, the elastic element 41 is also fixedly connected to the optical film 23, and the spacer 42 is located between the elastic element 41 and the liquid crystal panel body 11.

In one embodiment, the elastic element 41 is a double-sided foam, and a side of the elastic element 41 connected to the spacer 42 is adhesive, and a side of the elastic member 41 away from the spacer 42 is non-adhesive.

It should be noted that, in practice, the elastic element 41 may also be made of other materials, such as sponge, flexible rubber or flexible plastic, etc., which are not enumerated herein.

Figure 2:
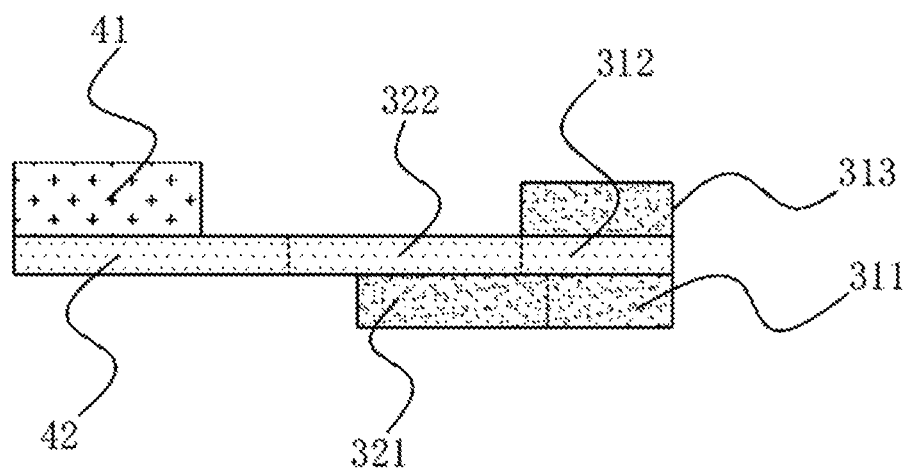
FIG. 2 is a schematic view showing a connecting portion of FIG. 1 is expanded.
Figure 3:
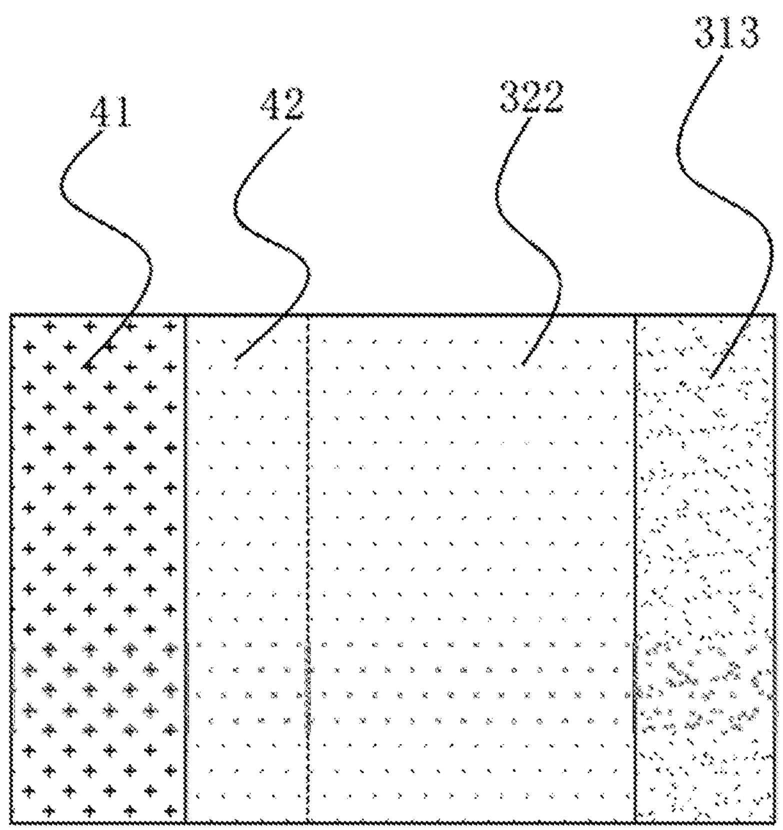
FIG. 3 is a schematic top plan view of the connecting portion of FIG. 2.
Figure 4:
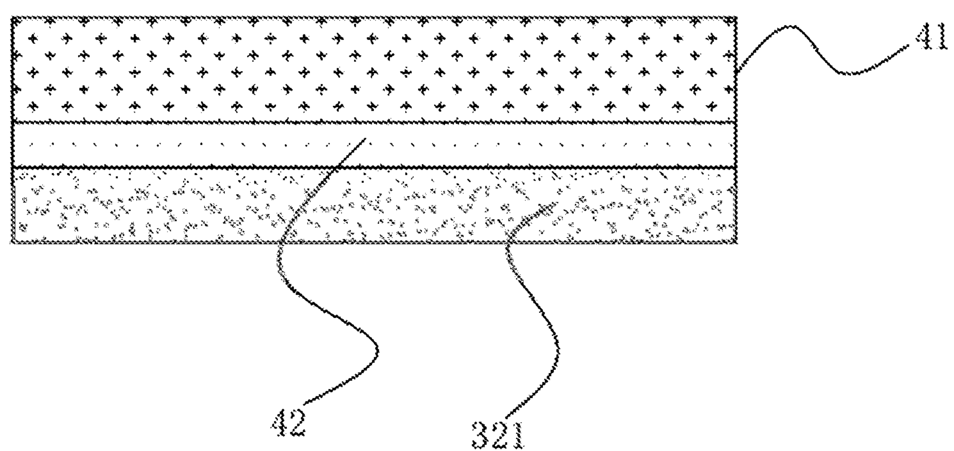
FIG. 4 is a schematic left side view of the connecting portion of FIG. 2.
Figure 5:
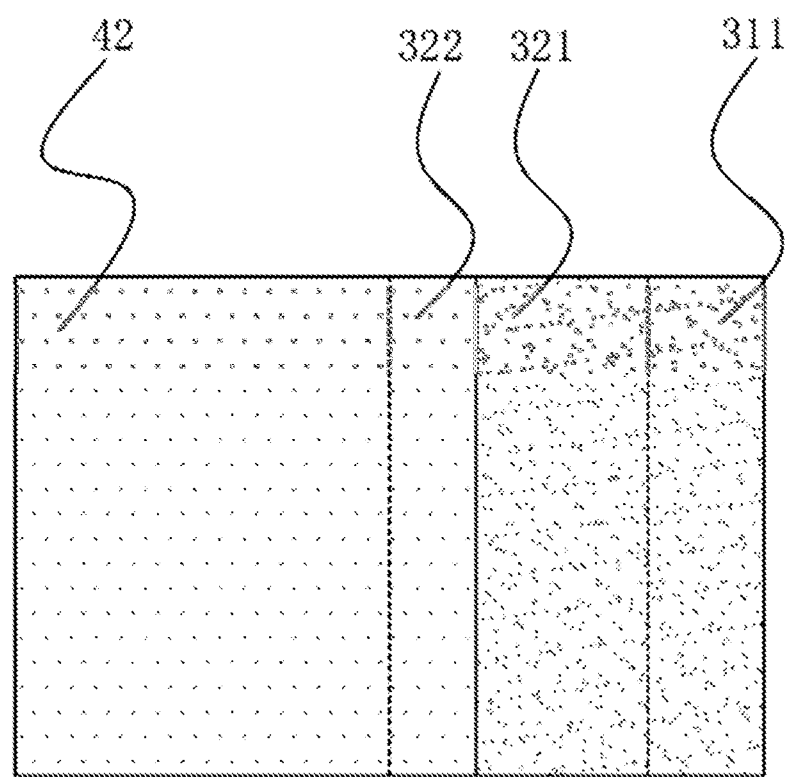
FIG. 5 is a schematic bottom plan view of the connecting portion of FIG. 2.

Please refer to FIGS. 2 to 5. FIG. 2 is a schematic view showing the connecting portion of FIG. 1 is expanded. FIG. 3 is a top plan view of the connecting portion of FIG. 2 being expanded. FIG. 4 is a left side view of the connecting portion of FIG. 2 being expanded. FIG. 5 is a bottom plan view of the connecting portion of FIG. 2 being expanded.

As shown in FIGS. 2 to 5, in one embodiment, the first adhesive layer 311 and the adhesive fixing layer 321 are integrally formed with each other. The spacer 42, the sealing layer 312, and the connection layer 322 are integrally formed with each other.

It should be noted that, in practice, the first adhesive layer 311 and the adhesive fixing layer 321 may be formed by using different materials. For example, the first adhesive layer 311 is formed by using double-sided tape, and the adhesive fixing layer 321 is made of foam rubber, and is not enumerated herein.

It should be noted that, in practice, the sealing layer 312, the connection layer 322, and the spacer 42 may also be made of different materials. For example, the sealing layer 312 is made of Mylar tape, and the connection layer 322 is made of polyterephthalic plastic. The phthalic plastic is formed, and the spacer 42 is made of polymethyl methacrylate, which is not enumerated here.

In one embodiment, the backlight module 20 further includes a light source 22 located in the accommodation chamber 50, a reflective plate 24, and a light guide plate 25. The light source 22 is fixedly disposed on the inner wall of the bent portion 212. The reflective plate 24 and the light guide plate 25 are both parallel with the backplate 211, the reflective plate 24 is fixedly disposed on the backplate 211, and the light guide plate 25 is disposed between the reflective plate 24 and the optical film 23.

Further, the light source 22 is disposed between the light guide plate 25 and the bent portion 212 to avoid the light source 22 obstructing the expansion of the optical film 23.

Figure 6:
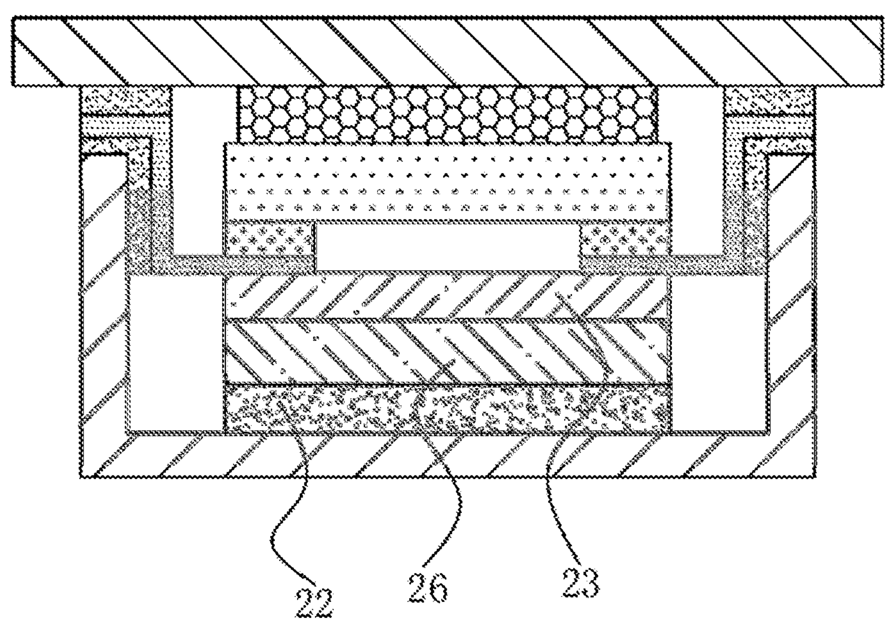
FIG. 6 is a schematic structural view of a liquid crystal display device of another embodiment of the present invention.

In another embodiment, as shown in FIG. 6, the backlight module 20 further includes a light source 22 and a diffuser plate 26 both disposed in the accommodation chamber 50. The light source 22 is fixedly disposed on the backplate 211, the diffuser plate 26 is disposed between the optical film 23 and the light source 22, and the diffuser plate 26 is parallel with the backplate 211.

The present invention has advantageous effects as follows: the present invention utilizes the first fixing portion to replace a conventional middle plastic frame structure, ensuring connecting strength and in-vehicle firmness of the back frame 21 with the display panel, so that thickness of a structure in a direction where the optical film 23 expands is reduced, thereby to meet a requirement of a narrow frame design of the liquid crystal display device. Furthermore, a sufficient space can be reserved between the optical film 23 and the inner wall of the bend portion 212 to avoid optical defects resulting from wrinkles formed on the optical film 232 due to obstruction of the expansion of the optical film 232.

Accordingly, although the present invention has been disclosed as a preferred embodiment, it is not intended to limit the present invention. Those skilled in the art without departing from the spirit and scope of the present invention may make various changes or modifications, and thus the scope of the present invention should be after the appended claims and their equivalents.

What is claimed is:

1. A liquid crystal display device, comprising:

a substrate comprising a first surface and a second surface opposite to the first surface;

a display panel, a backlight module, and a connecting portion connecting the backlight module and the display panel;

wherein the backlight module comprises a back frame, and the back frame comprises a backplate and a bent portion connected to the backplate, such that an accommodation chamber is formed between the bent portion and the backplate;

wherein the connecting portion comprises a first fixing portion and a second fixing portion, and the first fixing portion is disposed on an end surface of the bent portion and fixedly connected to the end surface of the bent portion and the display panel, wherein an orthographic projection of the end surface of the bent portion on the display panel covers an orthographic projection of an outer side of the first fixing portion on the display panel, wherein the first fixing portion comprises a first adhesive layer, a sealing layer, and a second adhesive layer laminated to each other, the sealing layer is connected to the end surface of the bent portion through the first adhesive layer, and the sealing layer is connected to the display panel through the second adhesive layer, and wherein the second fixing portion is fixedly connected to the first fixing portion, and is disposed on an inner wall of the bent portion and is attached to the inner wall of the bent portion;

wherein the second fixing portion comprises an adhesive fixing layer and a connection layer, the adhesive fixing layer is adhesively attached to the inner wall of the bent portion, a side of the connection layer is fixedly connected to the adhesive fixing layer, and another side of the connection layer is connected to the sealing layer.

2. The liquid crystal display device of claim 1, wherein the bent portion is disposed on peripheries of the backplate, wherein the backlight module further comprises an optical film disposed in the accommodation chamber, and a gap is formed between the optical film and the inner wall of the bent portion.

3. The liquid crystal display device of claim 2, wherein a buffer layer is disposed between the optical film and the display panel.

4. The liquid crystal display device of claim 3, wherein the buffer layer comprises an elastic element and a spacer laminated to each other, wherein the elastic element is fixedly connected to one of the display panel and the optical film, and the spacer is disposed between the other one of the display panel and the optical film and the elastic element.

5. The liquid crystal display device of claim 1, wherein the bent portion is disposed on peripheries of the backplate, and the backlight module further comprises an optical film disposed in the accommodation chamber, a gap is formed between the optical film and the inner wall of the bent portion, and a buffer layer is disposed between the optical film and the display panel, and wherein the buffer layer comprises an elastic element and a spacer laminated to each other, the elastic element is fixedly connected to one of the display panel and the optical film, and the spacer is disposed between the other one of the display panel and the optical film and the elastic element, wherein the spacer, the connection layer, and the sealing layer are integrally formed with each other, and the first adhesive layer and the adhesive fixing layer are integrally formed with each other.

6. The liquid crystal display device of claim 5, wherein the first adhesive layer, the second adhesive layer, and the adhesive fixing layer are all made of a viscous material, and the spacer, the connection layer, and the sealing layer are all made of an insulating sealing material.

7. The liquid crystal display device of claim 1, wherein the display panel comprises a touch screen body and a liquid crystal panel body disposed on a back of the touch screen body, wherein the liquid crystal display body is located in the accommodation chamber and is connected to the touch screen body, and the first fixing portion is connected to the back of the touch screen body.

8. The liquid crystal display device of claim 1, wherein the backlight module further comprises a light source located in the accommodation chamber, a reflective plate, and a light guide plate, wherein the light source is fixedly disposed on an inner wall of the bent portion, the reflective plate and the light guide plate are both parallel with the backplate, the reflective plate is fixedly disposed on the backplate, and the light guide plate is disposed between the reflective plate and the optical film.

9. The liquid crystal display device of claim 8, wherein the light source is disposed between the light guide plate and the bent portion.

10. The liquid crystal display device of claim 1, wherein the backlight module further comprises a light source and a diffuser plate both disposed in the accommodation chamber, wherein the light source is fixedly disposed on the backplate, the diffuser plate is disposed between the optical film and the light source, and the diffuser plate is parallel with the backplate.

* * * * *